(12) United States Patent
Amro et al.

(10) Patent No.: US 6,339,436 B1
(45) Date of Patent: Jan. 15, 2002

(54) USER DEFINED DYNAMIC HELP

(75) Inventors: Hatim Yousef Amro, Austin; John Paul Dodson, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/216,549

(22) Filed: Dec. 18, 1998

(51) Int. Cl.[7] .................................................. G06F 3/00
(52) U.S. Cl. .................... 345/714; 345/705; 345/808; 345/765; 345/708; 707/512
(58) Field of Search .................... 345/338, 336, 345/337, 347, 333, 334, 335, 340, 346, 708, 705, 702, 762, 808, 765, 714, 781, 804; 707/512; 709/329, 331, 315, 318

(56) References Cited

U.S. PATENT DOCUMENTS

| | | | |
|---|---|---|---|
| 5,428,729 A | * 6/1995 | Chang et al. | 345/331 |
| 5,432,940 A | * 7/1995 | Potts et al. | 709/320 |
| 5,546,521 A | * 8/1996 | Martinez | 345/155 |
| 5,602,982 A | * 2/1997 | Judd et al. | 345/326 |
| 5,751,914 A | * 5/1998 | Coley et al. | 706/47 |
| 6,133,917 A | * 10/2000 | Feigner et al. | 345/338 |

* cited by examiner

Primary Examiner—Raymond J. Bayerl
Assistant Examiner—Cuong T. Thai
(74) Attorney, Agent, or Firm—Sawyer Law Group, LLP

(57) ABSTRACT

The present invention provides a method for providing user-defined dynamic help text which is displayed integrally with the application. The method includes utilizing a monitoring program to monitor a plurality of events for the application; determining if a current event of the plurality of events is a spy event; if the current event of the plurality of events is a spy event, then displaying a help text corresponding to the current event of the plurality of events. In the preferred embodiment, the method also determines if the current event of the plurality of events is a user event if the current event is not a spy event. If the current event is a user event, then the help text corresponding to the current event of the plurality of events is updated according to a user text update. The method of the present invention uses a monitoring program which allows users to create customized help texts for any application. In the preferred embodiment, the monitoring program of the present invention uses spy threads and thus is non-intrusive to the application. In the preferred embodiment, because the monitoring program is a separate application which runs in synchronization with the application, the present invention may be used with any application.

7 Claims, 3 Drawing Sheets

USER DEFINED DYNAMIC HELP

FIELD OF THE INVENTION

The present invention pertains to computer applications and more particularly to application help files.

BACKGROUND OF THE INVENTION

Almost all computer applications have electronic help texts which users may access to obtain information on how to use the application. Some of these help texts are displayed integrally with the application, meaning that the help text is displayed as part of the application. Other help texts are provided as a completely separate file from the application. However, these help texts are conventionally fixed, i.e., the user cannot add or subtract from it. Such conventional help texts are typically written to address general use of the application and cannot be customized to the needs of specific users. Thus, conventional help texts are inadequate in situations such as when one user wishes to teach another user how to perform a specific maneuver in the application which is not addressed in the conventional help text.

FIG. 1 illustrates an example where User One 102 has an accounting application 106 and wishes to teach User Two 104 how to perform a complex accounting calculation with this application 106 which is tailored to the accounting procedures of their employer. The performance of this calculation is not addressed in the conventional help text 108 which accompanies the application 106. User One 102 cannot add or subtract from the conventional help text 108. Thus, the conventional help text 108 is inadequate for the task of teaching the performance of the calculation. In addition, if User One 102 is to provide a custom help text 110 for the calculation, he/she must provide it as a completely separate file. But as a separate text file, it cannot be displayed integrally with the application 106. The use of the custom help text 110 is thus cumbersome for User Two 104.

Accordingly, there exists a need for a method and system of providing a user-defined dynamic help text which is displayed integrally with the application. The present invention addresses such a need.

SUMMARY OF THE INVENTION

The present invention provides a method for providing user-defined dynamic help text which is displayed integrally with the application. The method includes utilizing a monitoring program to monitor a plurality of events for the application; determining if a current event of the plurality of events is a spy event; if the current event of the plurality of events is a spy event, then displaying a help text corresponding to the current event of the plurality of events. In the preferred embodiment, the method also determines if the current event of the plurality of events is a user event if the current event is not a spy event. If the current event is a user event, then the help text corresponding to the current event of the plurality of events is updated according to a user text update. The method of the present invention uses a monitoring program which allows users to create customized help texts for any application. In the preferred embodiment, the monitoring program of the present invention uses spy threads and thus is non-intrusive to the application. In the preferred embodiment, because the monitoring program is a separate application which runs in synchronization with the application, the present invention may be used with any application.

DETAILED DESCRIPTION

The present invention provides a method and system for providing a user-defined dynamic help text which is displayed integrally with the application. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

The present invention provides a method and system of providing help text which the user may create and which may be displayed integrally with the application. This is accomplished through a monitoring program which runs synchronized with the application but in the background. When the application running with the monitoring program running in the background, the monitoring program displays help text which corresponds to each event present by the application as part of the application. If no help text exists for the event, the user may create help text. If help text already exists for the event, the user may edit the text. The help texts are stored in a separate help text file for portability.

Figure 2:
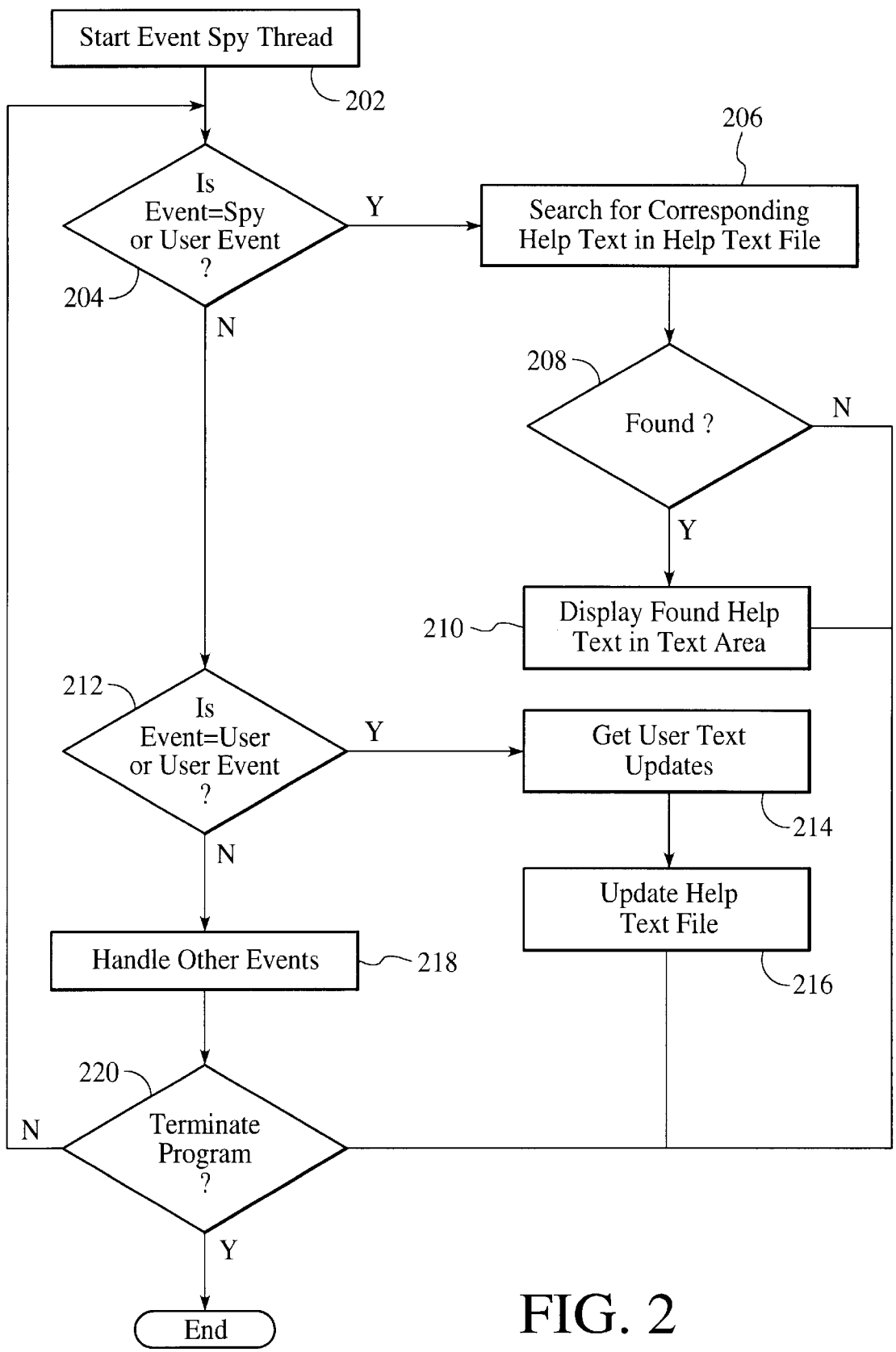
FIG. 2 is a flow chart illustrating a preferred embodiment of the method for providing user-defined dynamic help text which is displayed integrally with the application in accordance with the present invention.

FIG. 2 is a flow chart illustrating a preferred embodiment of the method of providing a user-defined dynamic help text which is displayed integrally with the application in accordance with the present invention. The present invention uses a monitoring program which when initiated, starts the event spy thread, via step 202. The spy thread is a process of the monitoring program which reads the event queue of the operating system. The event queue holds the events of all of the applications currently running in the operating system. An event queue is well known in the art and will not be discussed in detail here.

Two types of events, "spy events" and "user events", are of particular interest to the monitoring program. Spy events, as used in this specification, are events for the application which the monitoring program is monitoring. Examples of spy events include the display of a particular screen in the application or the selection of a menu option. User events, as used in this specification, are events in which the user indicates his wish to edit help text for the application monitored. Other types of events the monitoring program may process includes known Graphic User Interface (GUI) events, such as mouse clicks and keyboard strokes.

When an event from the application occurs, information concerning this event is obtained from the operating system's event queue by the spy thread and sent to the event handling loop of the monitoring program (steps 204–218). The event handling loop determines which events to act upon and what the action should be. If the event is either a spy or user event, via step 204, the monitoring program searches the help text file for a corresponding help text, via step 206. If a corresponding help text is found, then the text is displayed in a text area, such as a window, integrally with the application, via step 210.

If the event is specifically a user event, via step 212, then the monitoring program gets the user text updates for the event, via step 214. The help text file is then updated with the new help test, via step 216, with the help text stored as corresponding to the event.

If the event is neither a spy event nor a user event, then it is another type of GUI event and the monitoring program handles it accordingly, via step 218. The monitoring program then loops back to the beginning of the event handling loop to await the next event. This continues until the monitoring program is terminated, via step 220.

Figure 1:
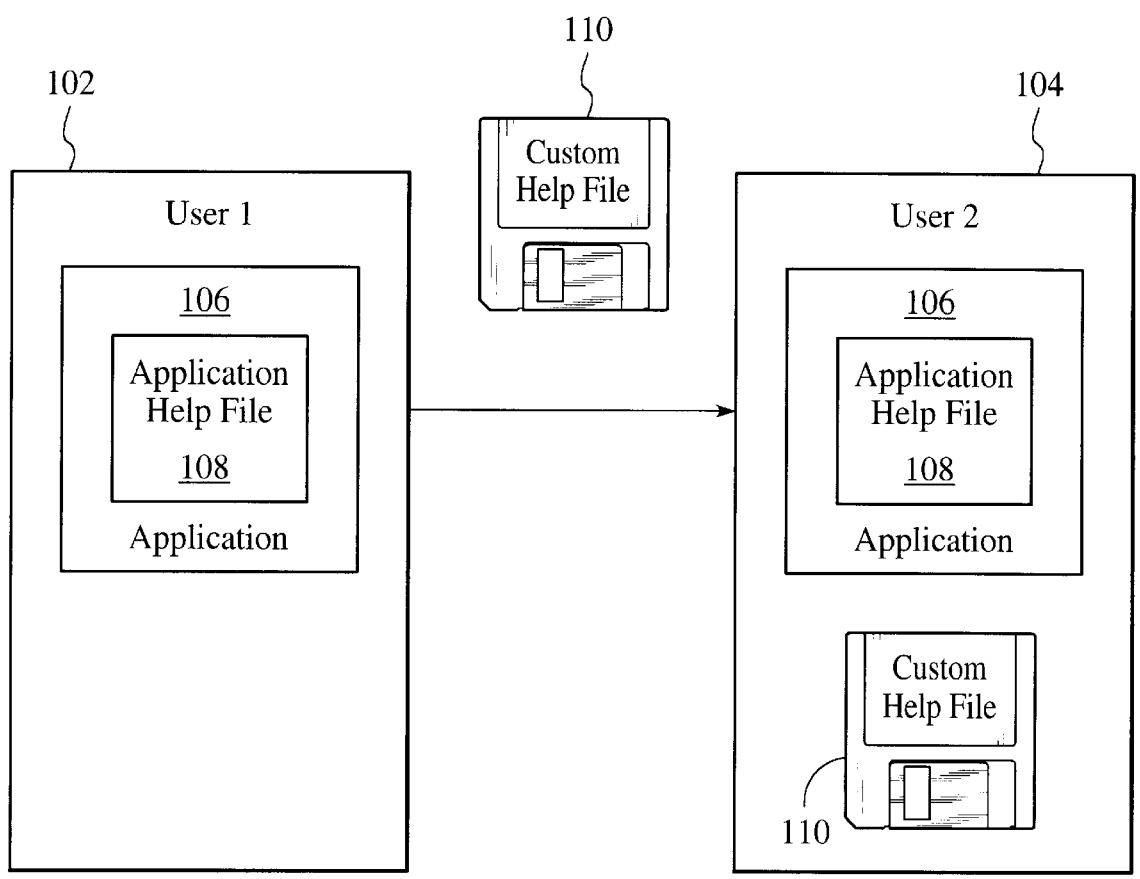
FIG. 1 illustrates an example of the use of a conventional help text for an application.
Figure 3:
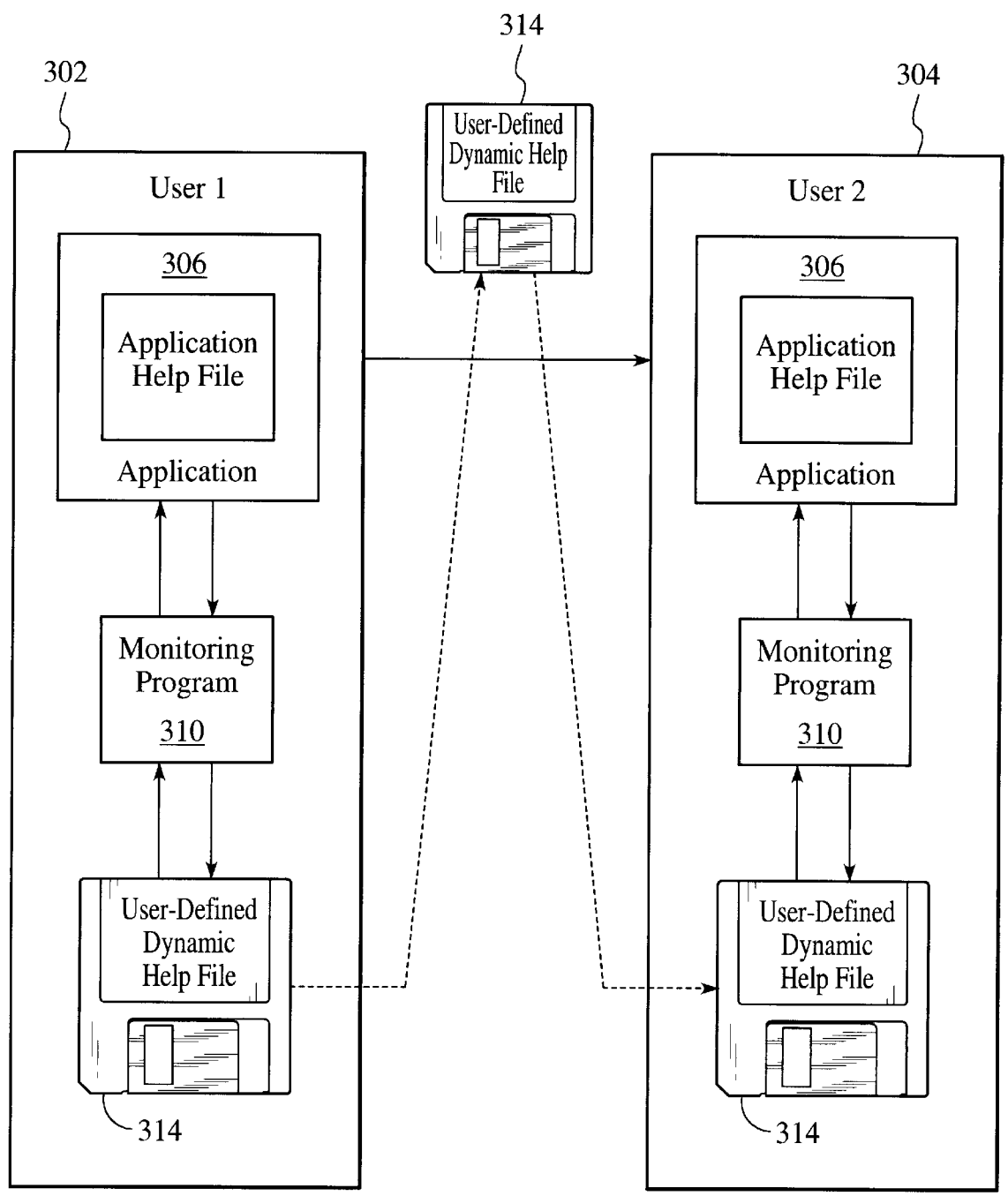
FIG. 3 illustrates an example of the use of a user-defined dynamic help file in accordance with the present invention.

FIG. 3 illustrates the use of the preferred embodiment of a user-defined dynamic help file in accordance with the present invention. Both User One 302 and User Two 304 have computers which run the accounting application 306 and a monitoring program 310, 312 of the present invention. This example involves User One and User Two illustrated in FIG. 1. First, User One 302 initiates the monitoring program 310 of the present invention. In the preferred embodiment, this may be accomplished either by dragging the monitoring program icon or the application icon and placing it over the other or by executing a run command for the monitoring program 310 to run in sync with the application 306. However, a person of ordinary skill in the art will understand that other methods of initiating the monitoring program 310 may be used without departing from the spirit and scope of the present invention.

When the monitoring program 310 is initiated by User One 302, the event spy thread is started, via step 202. User One 302 then begins to perform accounting calculations in the accounting application 306 in the way he wishes User Two 304 to perform them. Each time User One 302 performs a function in the calculation, the monitoring program 310 recognizes it as a spy event, via step 204. Assume that the function in this example is the start screen for the application 306. The monitoring program 310 searches the user-defined dynamic help text file 314 for a corresponding help text for the start screen, via step 206. Assuming this is the first time that a user is creating the help text, there will be no corresponding help text. In the preferred embodiment, an empty help text window would then be displayed integrally with the start screen.

User One 302 indicates his wish to add text to this empty help text window by clicking the right mouse button inside the window. User One's clicking of the right mouse button is recognized by the monitoring program 310 as a user event, via step 204. It searches the user-defined dynamic help text file 314 for a corresponding help text for the start screen, via step 206. Since there is no corresponding help text, an empty help text window continues to be displayed. Since the event is a user event, via step 212, the monitoring program 310 then gets User One's help text via step 214. For example, User One 302 may input "Select main vendor file to open . . . " as the help text. This help text is then stored in the user defined dynamic help text file 314, via step 216, as corresponding to start screen. The monitoring program 310 then loops back to await the next event.

User One 302 then selects a file to open in the application 306. When the file is opened and displayed, the monitoring program 310 recognizes this as another as another spy event, via step 204. The monitoring program 310 searches the user-defined dynamic help text file 314 for corresponding help text for the opened file screen, via step 206. Again, no existing help text will exist for this new screen. An empty help text window is then displayed.

User One 302 clicks the right mouse button inside the window. The monitoring program 310 recognizes this as a user event, via step 204. Another search of the user-defined dynamic help text file 314 for corresponding help text for the opened file screen, via step 206. Since no help text exists for this new screen, an empty help text window is continued to be displayed. Since the event is a user event, via step 212, the monitoring program then gets User One's inputs for this new screen via step 214, such as "Input transaction number . . . ". The monitoring program 310 stores it in the user-defined dynamic help text file 314, via step 216. User One 302 repeats the above steps until the entire accounting function has been performed. The result is a user-defined dynamic help text file 314 with help texts corresponding to various events for the application 306 which will guide User Two 304 through the entire accounting calculation.

User One 302 then gives User Two 304 the user-defined dynamic help text file 314 containing the help texts he created. The user-defined dynamic help file 314 may be given to User Two 304 via a floppy disk or some other means. User Two 304 initiates his copy of the monitoring program 312 of the present invention in the same manner as User One 302. When the start screen for the application 306 is displayed, the monitoring program 312 recognizes this as a spy event, via step 204. The monitoring program 312 then searches the user-defined dynamic help text file 314 for help text which corresponds to the start screen, via step 206. The help text, "Select main vendor file to open . . . " created by User One 302 is found and displayed in a window, integrally with the application 306, via steps 208 and 210. User Two 304 then follows User One's instructions in the help text and selects the main vendor file to open. A new screen is displayed showing the main vendor file. This is recognized by the monitoring program 312 as another spy event, via step 204. The monitoring program 312 searches the user-defined dynamic help text file 314, finds User One's help text for the new screen, and displays the help text via steps 206, 208 and 210. User Two 304 decides at this point that he wishes to make additional notes for himself for future reference. He indicates his wish to add to the help text created by User One 302 with a right mouse button click inside the help text window. Although the preferred embodiment uses a right mouse button click to indicate a wish to edit help text, one of ordinary skill in the art will understand that any type of indication may be used without departing from the spirit and scope of the present invention. The monitoring program 312 recognizes the left mouse click inside the help text window as a user event, via step 204. The corresponding help text for this screen is found and continues to be displayed in the help text window, via steps 206, 208 and 210. User Two then edits the help text. The monitoring program 312 obtains User Two's text edits, via step 214, and stores the updated help text in the user-defined dynamic help text file 314, via step 216. User Two 304 then continues through the application as guided by User One's help texts.

A method and system for providing a user-defined dynamic help text which is displayed integrally with the application has been disclosed. The method of the present invention uses a monitoring program which allows users to create customized help texts for any application. Because the monitoring program of the present invention utilizes spy threads, it is non-intrusive to the application. Because the monitoring program is a separate application which runs in synchronization with the application, the present invention may be used with any application.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of providing user-defined dynamic help text for an application, comprising the steps of:
   (a) utilizing a monitoring program to monitor a plurality of events for the application;
   (b) determining if a current event of the plurality of events is either a spy event or a user event;
   (c) searching a help text file for a help text corresponding to the current event of the plurality of events if the current event of the plurality of events is the spy event, wherein if the help text is found, then displaying the help text in a text area; and
   (d) getting a user-defined text update and updating the help text file according to the user-defined text update if the current event of the plurality of events is the user event, wherein the user event indicates a user's wish to edit the help text file.

2. The method of claim 1, wherein the monitoring program is a program separate from the application, wherein the monitoring program runs synchronized with the application.

3. The method of claim 1, wherein the current event of the plurality of events is obtained with a spy thread.

4. The method of claim 1, wherein the help text is displayed integrally with the application.

5. The method of claim 1, wherein if the help text corresponding to the current event of the plurality of events is not found, then a blank window is displayed.

6. A method for providing a user-defined dynamic help text for an application, comprising the steps of:
   (a) utilizing a monitoring program to monitor a plurality of events for the application,
      wherein the monitoring program is a program separate from the application,
      wherein the monitoring program runs synchronized with the application;
   (b) determining if a current event of the plurality of events is a spy event or a user event,
      wherein the current event of the plurality of events is obtained with a spy thread;
   (c) searching a help text file for a help text corresponding to the current event of the plurality of events if the current event of the plurality of events is the spy event,
      wherein if the text is found, then display the help text in a text area,
      wherein the help text is displayed integrally with the application,
      wherein if the help text corresponding to the current event of the plurality of events is not found, then a blank window is displayed; and
   (d) getting a user-defined text update and updating the help text file according to the user-defined text update if the current event is the user event,
      wherein the user event indicates a user's wish to edit the help text file.

7. A computer readable medium with computer instructions for providing user-defined dynamic help text for an application, comprising the instructions for:
   (a) utilizing a monitoring program to monitor a plurality of events for the application;
   (b) determining if a current event of the plurality of events is either a spy event of a user event;
   (c) searching a help text file for a help text corresponding to the current event of the plurality of events if the current event of the plurality of events is the spy event, wherein if the help text is found, then displaying the help text in a text area;
   (d) getting a user-defined text update and updating the help text file according to the user-defined text update if the current event of the plurality of events is the user event, wherein the user event indicates a user's wish to edit the help text file.

* * * * *